E. F. NORTHRUP, M. E. LEEDS & C. R. CARY.
RESISTANCE THERMOMETER.
APPLICATION FILED NOV. 21, 1908.
955,191.   Patented Apr. 19, 1910.
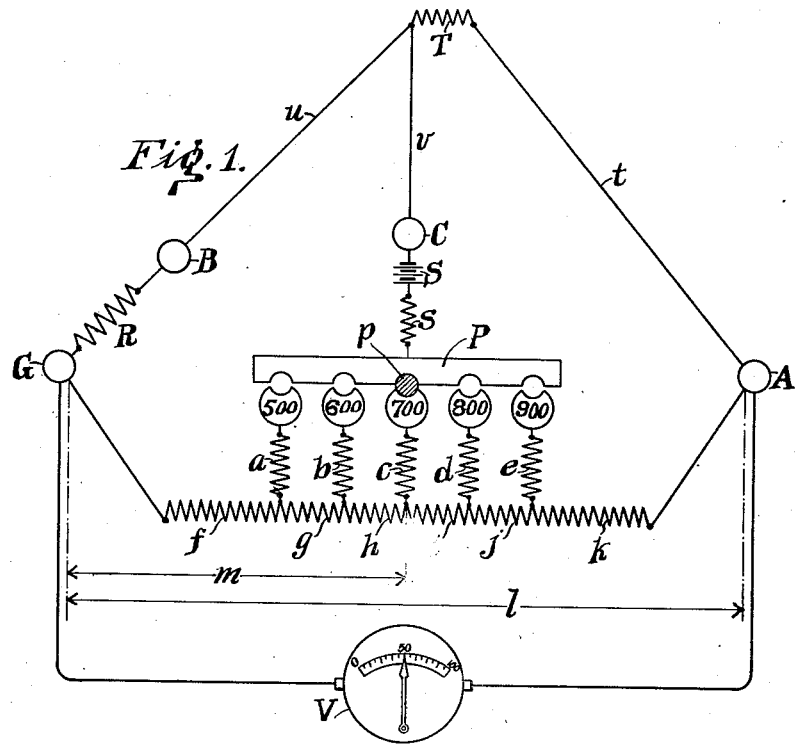
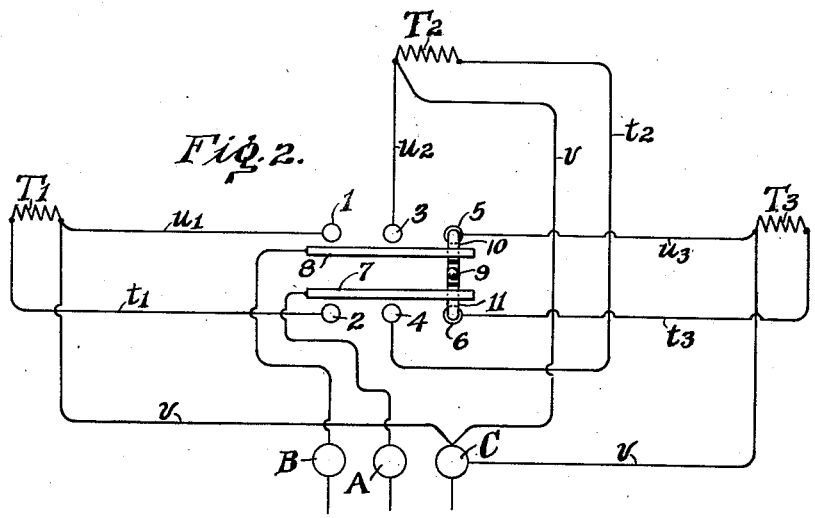
Witnesses:
Daniel C. Webster, Jr.
A. E. Steinbock
Inventors:
Edwin F. Northrup,
Morris E. Leeds and
Charles R. Cary
By Cornelius D. Ehret
their Attorney.

UNITED STATES PATENT OFFICE.

EDWIN F. NORTHRUP, MORRIS E. LEEDS, AND CHARLES R. CARY, OF PHILADELPHIA, PENNSYLVANIA, ASSIGNORS TO LEEDS AND NORTHRUP COMPANY, A CORPORATION OF PENNSYLVANIA.

RESISTANCE-THERMOMETER.

955,191.   Specification of Letters Patent.   Patented Apr. 19, 1910.

Application filed November 21, 1908. Serial No. 463,811.

*To all whom it may concern:*

Be it known that we, EDWIN F. NORTHRUP, MORRIS E. LEEDS, and CHARLES R. CARY, citizens of the United States, residing in Philadelphia, county of Philadelphia, and State of Pennsylvania, have invented new and useful Improvements in Resistance-Thermometers, of which the following is a specification.

This invention relates to means for measuring temperatures by the employment of a resistance conductor or unit, commonly called a "resistance bulb," subjected to the temperature to be measured, in association with a Wheatstone bridge arrangement, a source of energy, and an electrical indicating or measuring instrument.

Our invention resides in an apparatus of the character above described in which the zero or balancing method is not employed, except to the extent hereinafter indicated; but the temperature is read by a deflection of the galvanometer or other measuring instrument, the reading on the instrument being directly in temperature units, and the instrument reading being supplemental to readings, in temperature units, corresponding with the position of a plug or switch, hereinafter referred to, by which an approximate balance only is obtained.

A feature of our invention is the employment, in such apparatus, of a resistance intervening between adjacent bridge arms and tapped at a plurality of points and connected with a plurality of contacts adapted to be engaged by a plug or switch arm, whereby more or less of the intervening resistance is included in one or the other of the adjacent bridge arms, depending on the temperature of the bulb resistance.

Another feature of our invention is the use, in connection with such apparatus, of a galvanometer or electrical measuring instrument reading directly in units of temperature, the range of the measuring instrument being small as compared with the total range of temperature measurable by the apparatus; but the instrument range corresponds with the difference in the temperatures indicated by neighboring contacts of the switch associated with the intervening resistance, each switch contact indicating, when the plug or switch arm is in engagement with it, a reading in units of temperature. The temperature to be measured is determined by the reading corresponding with the switch contact which is in circuit and the reading of the measuring instrument, the one reading supplementing the other.

Our invention resides also in making the taps in the intervening resistance at such points as to compensate or correct for any variations, from a linear or straight line function, of the relation between resistance and temperature of the bulb resistance.

A further feature of our invention relates to compensating or correcting, as by resistance connections between the switch contacts and the various points tapped on the intervening resistance, for changes of resistance in the circuit of the galvanometer or measuring instrument which would otherwise result (independently of any changes in resistance of the bulb resistance) from the movement of the plug or switch arm to different contacts communicating with various points on the intervening resistance. The source of energy employed having a substantially constant voltage, these changes in resistance would otherwise cause incorrect readings on the measuring instrument.

A feature of our invention resides also in having the indicator of the measuring instrument pointing at mid scale when no current is passing through the measuring instrument. The result is to halve any error which might result from a change in the voltage of the source of energy, or from any change in the constant of the galvanometer or measuring instrument.

Our invention resides also in the method of temperature measurement and other features hereinafter pointed out and claimed.

For an illustration of one of the forms our invention may take, reference is to be had to the accompanying drawing, in which:

Figure 1 is a diagrammatic view illustrating a resistance thermometer of our invention. Fig. 2 is a fragmentary diagrammatic view illustrating how a plurality of bulb or thermometer resistances may be associated with the same apparatus. Fig. 3 is a representation of an interchangeable bulb resistance.

Referring to Fig. 1, T represents a bulb or thermometer resistance which is of any suitable form, a standard form consisting of a pure nickel or a pure platinum wire wound on a mica frame and contained within a quartz, porcelain, or other suitable tube, carrying terminals, the tube being thrust into the gas, liquid, solid or other material whose temperature is to be measured. From one of the terminals of the resistance T extends a lead or conductor $t$ connected to the point or binding post A. From the other terminal of the resistance T a similar lead or conductor $u$ extends to the point or binding post B. And from the same terminal of the resistance T extends a lead or conductor $v$ connecting to the point or binding post C. These three conductors, $t, u, v$, are preferably formed into a braid or twist and extend between the reading or indicating apparatus and the bulb resistance T, so that all are subjected to like conditions of temperature. The two leads $t$ and $u$ must have the same resistance; that is, they must be of the same length, cross section and material. By this arrangement, any change of temperature of these leads will cause the same variation in resistance in both $t$ and $u$ with a resultant substantially *nil* effect upon the balance or other adjustment of the bridge apparatus, due to the fact that the bridge arm lead or conductor $v$ is carried to one terminal of the bulb or thermometer resistance T. The leads $t$ and $u$ are in different bridge arms, and, as above stated, since they both change alike in temperature they change similarly in resistance, and this resistance change has substantially no effect upon the bridge.

In the same arm of the bridge with the lead $u$ is connected the resistance R between the binding post B and the point or binding post G. The resistance R and the lead $u$ are connected in one arm of the bridge, while the bulb resistance T and the lead $t$ are connected in another arm of the bridge. The resistance R is preferably chosen equal to the resistance of the bulb or thermometer resistance T corresponding with a temperature which is the mean of the range of the instrument. In the other arms of the bridge are connected the resistances $f$ and $k$ with the intervening resistance consisting of the resistance sections $g, h, i,$ and $j$. From suitable points taps or connections are made through the resistances $a, b, c, d$ and $e$ to a plurality of plug or switch contacts, opposed to which is a plug or switch bar P, the plug $p$ being shown, by way of example, as connecting the bar P with the middle plug contact. And connected between the bar P and the binding post C are the resistance $s$ and the source of energy S. This source of energy is preferably of a constant potential and may be, for the example hereinafter given, of 110 volts pressure, such as an ordinary lighting or power circuit.

Connected to the posts or points A and G is the galvanometer, indicator or other measuring instrument V. For a direct current source a Deprez-D'Arsonval galvanometer serves very well.

By inserting the plug $p$ in the different plug holes the distribution of resistance between the two lower bridge arms may be changed; in other words, more or less of the intervening resistance $(g+h+i+j)$ is connected in one or the other of the lower bridge arms.

Representing the resistance from the point G to the point A by $l$, and representing the resistance from the point G to the point where the middle plug is connected to the intervening resistance by $m$, we have, from the ordinary equation of the Wheatstone bridge:

$$\frac{R}{T} = \frac{m}{l-m}$$

$$l\,R - R\,m = T\,m$$

$$l\,R = m\,(T+R)$$

$$m = \frac{R\,l}{T+R}$$

And assuming that the mean of the temperature range of the instrument is 750 degrees centigrade, and that the resistance of T at that temperature is 29.3 ω (29.3 ohms), and that the resistance $l$ is 100 ω (100 ohms), and assuming R equal to T, we find that $$m = f+g+h = 50\omega$$

Since the resistance of the bulb or thermometer T varies with temperature otherwise than in a strictly proportional or linear way, and since the apparatus is to be calibrated to read directly in degrees of temperature, the taps $a, b, c, d$ and $e$ are taken out at non-uniformly recurring points along the intervening resistance $g+h+i+j$. In other words, the resistances $g, h, i$ and $j$ are not equal to each other, even in case the bulb resistance T varies in resistance strictly proportionally to the temperature. And when the bulb resistance T does not vary in resistance proportionally to the temperature, these resistances $g, h, i$ and $j$ differ from what they would be in the case where the resistance of T varied strictly proportionally with the temperature, by an amount sufficient to compensate for the non-proportionate change in resistance with respect to temperature in T, whereby the apparatus operates as if the resistance T did vary strictly proportionally with the temperature. Thus, assuming the values in the example above given, $f=46.25\omega$; $g=1.782\omega$; $h=1.968\omega$; $i=2.274\omega$; $j=2.512\omega$; $k=45.214\omega$; the resistance of the galvanometer or measuring instrument V approximately $100\omega$; and the resistance $s$ approximately $475\omega$. And the resistances $a$, $b$, etc., are, by way of example, as follows: $a=114\omega$; $b=150\omega$; $c=234\omega$; $d=310\omega$; and $e=350\omega$. When the plug $p$ is in the position shown in Fig. 1, the resistance $c$ is in series with the resistance $s$ and the source of energy S. And when the plug is in any other hole a different amount of resistance is connected in series in said circuit. These resistances are different in value in order that the difference of potential at the terminals of the measuring instrument V shall be the same for equal changes of resistance of the bulb resistance T, provided that the plug $p$ be inserted in the hole corresponding with the lowest temperature of the range in which said bulb resistance lies. It is to be understood, however, that the values of the different resistances above given are by way of example merely and that our invention is not restricted to them or to their proportions.

Thus, we provide two compensations. One, by choosing the resistances $g$, $h$, $i$ and $j$ of suitable and different values to fulfil the law of the bridge and to take care of the non-uniform variation of the resistance T in relation to temperature. A second compensation is provided, by changing the resistance in series with the source S for different plug positions, so that the amount of current passing through the measuring instrument V, assuming a constant potential source, will be the same for the same changes in the resistance of T at all positions of the plug $p$; i. e., so that irrespective of what the temperature of the bulb T may be, and irrespective of what hole the plug $p$ may occupy, a given change in resistance in the bulb T will cause a given current through the instrument V, and therefore a given deflection of that instrument. This second compensation is such that when the plug $p$ is inserted in the hole corresponding with the lower limit of the particular range of resistance in which the bulb resistance lies, the current through the measuring instrument will be independent of that particular range, and dependent only upon the relative change of resistance of the bulb with respect to the limits of that range.

The mode of using the instrument is as follows: The bulb resistance T is inserted into the medium or material whose temperature is to be measured. It then takes the temperature of the surrounding medium and acquires a certain corresponding resistance. The plug $p$ is then inserted in such hole that the galvanometer needle indicates some reading between zero and 100, the calibration marks of the galvanometer being in degrees. For the position shown in Fig. 1, the plug is inserted at the middle contact and the instrument indicates at 50 degrees. But the needle and scale of the galvanometer V are so disposed that when there is no current through the galvanometer the needle points at mid scale, namely, 50 degrees. The temperature to be measured is then 700, the mark on the contact with which the plug is in engagement, plus the instrument reading which is 50 degrees. That is to say, the temperature to be determined is 750 degrees. And the range of the instrument of Fig. 1 is from 500 degrees to 1,000 degrees centigrade. By thus having the instrument needle point at mid scale for zero current through the instrument, the error which is due to a change in potential of the source S, or a change in the constant of the galvanometer V, is halved. And the readings upon the plug contacts, from 500 to 900, as here shown, are, in fact, low by 50 degrees. This will appear from the fact that with the plug in the position shown, a bridge balance exists, since the needle of the instrument points at mid scale, meaning that there is no current passing through the galvanometer, and the temperature to be measured is, in fact, 750 degrees. That is to say, with an instrument pointing at mid scale for no current through the instrument, the plug contacts are marked 50 degrees lower than the real temperature which would cause a balance at such plug positions. Assuming the plug $p$ to be in engagement with the contact marked 600, and the needle of the instrument pointing at 75 on its scale, the temperature would be $600+75=675$ degrees. And if the plug is in the same position and the instrument needle points at 10 upon its scale the temperature is $600+10=610$ degrees.

The range of the measuring instrument or galvanometer V is equal to the difference between the readings upon neighboring plug contacts. The plug $p$ is inserted by the operator in the hole opposite that contact which affords the nearest to a true balance, and the remainder of the total reading is determined by the instrument V. And for each plug position there is a possibility of a balance of the bridge, because for each plug position the instrument needle may point at 50 or mid scale, which means that no current is passing through the instrument and that the bridge is balanced. But the method herein pursued is not the commonly known zero or balancing method where the bridge is always balanced before the temperature is read. In our apparatus the bridge may be in balance, as above stated, but the method pursued is to only approximately balance the bridge and then add the reading of the plug contact with the instrument reading. Or we may say that the bulk of the temperature interval measured is read from the stationary contacts, the small outstanding remainder being given by the position of a deflecting indicator. The instrument V in nearly every case, except where there is a balance for each plug position, indicates that current is passing through it, while in the usual zero or balancing method no reading is taken until there is no current through the galvanometer or indicating instrument.

Obviously, the galvanometer V and source of energy S may be interchanged.

In Fig. 2 are shown a plurality of resistance bulbs $T^1$, $T^2$ and $T^3$ which may be located at a distance from each other and from the bridge instrument. A switch is provided for bringing any one of the bulb resistances into communication with the instrument. The binding posts A and B and C, in Fig. 2, correspond with the same binding posts of Fig. 1, a conductor $v$ extending from binding post C to corresponding terminals of each of the bulb resistances. These bulb resistances are interchangeable, as they must be if the same bridge instrument is to be used to determine temperatures. That is, they have the same total resistance, with their respective leads $t^1$, $u^1$, etc., and have the same law of variation of resistance with temperature variation. The terminals of the bulb resistance $T^1$ connect with the contacts 1 and 2; the terminals of the resistance $T^2$ with the contacts 3 and 4; and the terminals of the resistance $T^3$ with the contacts 5 and 6. The binding posts A and B are connected respectively with the contact strips or bars 7 and 8. A switch 9, whose contacts 10 and 11 are insulated from each other and are adapted to engage the bars 8 and 7, respectively, and engage the various contacts, brings the different bulb resistances into communication with the binding posts A and B. The mode of reading or determining the temperature is that explained in connection with Fig. 1.

As before stated, interchangeable bulb resistances must be adjusted to exact equality both with respect to resistance and temperature coefficient. To secure equality in temperature coefficient a certain resistance of manganin, having practically zero temperature coefficient, may be connected in series or in shunt with those bulb resistances whose temperature coefficient is too high. Thus, in Fig. 3 the bulb resistance T is shown as made up of two serially connected conductors $o$ and $r$, the former of pure platinum, pure nickel, or other suitable material, and $r$ of manganin, or other material having a less temperature coefficient than $o$, the two conductors, or wires being secured to each other preferably by hard silver solder for low temperatures, or by welding for high temperatures.

For the sake of clearness the conductor extending across the bridge and including the source of energy S is termed a conjugate conductor; so also is the conductor extending from A to G including the instrument V a conjugate conductor.

What we claim is:

1. In temperature measuring apparatus, the combination with a Wheatstone bridge and its source of current and its galvanometer associated with said bridge, said galvanometer calibrated in temperature units, of a bulb resistance included in an arm of said bridge, a resistance intervening between adjacent bridge arms, and switch contacts connected to points of said intervening resistance for including more or less of said intervening resistance in one or the other of said adjacent bridge arms for approximately balancing the bridge, said contacts giving readings in temperature units, and said galvanometer giving readings supplemental to the contact readings.

2. In temperature measuring apparatus, the combination with a Wheatstone bridge and its source of current and its galvanometer associated with said bridge, of a bulb resistance included in an arm of said bridge, a switch having a plurality of contacts, and taps from adjacent bridge arm resistances to said contacts, the resistances between taps being of such magnitude as to compensate for the non-uniform change in bulb resistance with relation to the temperature to which it is subjected.

3. In temperature measuring apparatus, the combination with a Wheatstone bridge and its source of current and its galvanometer associated with said bridge, of a bulb resistance included in an arm of said bridge, a switch in a conjugate conductor comprising a plurality of contacts, adjacent bridge arm resistances, and taps therefrom to said contacts, the resistances between taps being of such magnitude as to compensate for the non-uniform change in bulb resistance with relation to the temperature to which it is subjected.

4. In temperature measuring apparatus, the combination with a Wheatstone bridge and its source of current and its galvanometer associated with said bridge, said galvanometer calibrated in temperature units, of a bulb resistance included in an arm of said bridge, and a switch having a plurality of contacts connected to the resistance in adjacent bridge arms for changing the amount of resistance in adjacent bridge arms, each switch contact giving a reading in temperature units, said galvanometer giving mid scale reading when said bridge is balanced, and said galvanometer giving readings supplemental to said switch contact readings.

5. In temperature measuring apparatus, the combination with a Wheatstone bridge and its source of current and a measuring instrument associated with said bridge, of a bulb resistance in an arm of said bridge, a switch having a plurality of contacts, resistance in adjacent bridge arms external to the bridge arm which includes said bulb resistance, said switch contacts controlling said resistance in adjacent bridge arms for approximately balancing the bridge, each switch contact giving a reading, and said measuring instrument giving a reading supplemental to the switch contact reading.

6. In temperature measuring apparatus, the combination with a Wheatstone bridge and its source of current and a measuring instrument associated with said bridge, of a bulb resistance included in an arm of said bridge, a switch having a plurality of contacts connected to adjacent bridge arm resistances, and a resistance brought into a conjugate conductor by each switch contact.

7. In temperature measuring apparatus, the combination with a Wheatstone bridge and its source of current and a measuring instrument associated with said bridge, of a bulb resistance inclined in an arm of said bridge, and a switch in a conjugate conductor having a plurality of contacts for securing an approximate balance of the bridge, and a resistance brought into series with said conjugate conductor by each switch contact.

8. In temperature measuring apparatus, the combination with a Wheatstone bridge and its source of current and a measuring instrument associated with said bridge, of a bulb resistance included in an arm of said bridge, a switch having a plurality of contacts, and a plurality of connections from points in adjacent bridge arm resistances to said contacts, said connections including different resistances.

9. In temperature measuring apparatus, the combination with a Wheatstone bridge and its source of current and a measuring instrument associated with said bridge, of a bulb resistance included in an arm of said bridge, a switch having a plurality of contacts, and a plurality of connections from points in adjacent bridge arm resistances to said contacts, said connections having different resistances for rendering the current through said instrument dependent only upon the change in bulb resistance, and the magnitude of the bridge arm resistances between said connections being such as to compensate for the non-uniform change in bulb resistance with relation to the temperature to which it is subjected.

10. In direct reading temperature measuring apparatus, the combination with a Wheatstone bridge and its source of energy and a measuring instrument associated with said bridge, said source of energy being a commercial electric circuit and said measuring instrument calibrated in temperature units, of a bulb resistance included in an arm of said bridge, a resistance in adjacent bridge arms external to the bridge arm which includes said bulb resistance, and a switch having a plurality of contacts for controlling the amount of said resistance in adjacent bridge arms, whereby the bridge may be approximately balanced, each switch contact giving a reading, and said measuring instrument giving a reading supplemental to the switch contact reading.

11. In temperature measuring apparatus, the combination with a Wheatstone bridge and its source of current and a measuring instrument associated with said bridge, of a bulb resistance included in an arm of said bridge, resistance in adjacent bridge arms external to the bridge arm which includes said bulb resistance, and a switch having a plurality of contacts controlling said resistance in adjacent bridge arms, whereby said bridge may be approximately balanced, each switch contact giving a reading, and the range of said measuring instrument being equal to the difference in readings of neighboring switch contacts.

12. In temperature measuring apparatus, the combination with a Wheatstone bridge and its source of current and a measuring instrument associated with said bridge and pointing to mid scale when no current flows through said instrument, of a bulb resistance included in an arm of said bridge, and a switch having a plurality of contacts for securing an approximate balance of the bridge, each switch contact giving a reading, said measuring instrument giving a reading supplemental to each switch contact reading, and the range of said measuring instrument being equal to the difference in readings of neighboring switch contacts.

13. In temperature measuring apparatus, the combination with a Wheatstone bridge and its source of current and a measuring instrument associated with said bridge and reading in units of temperature and pointing to mid scale when no current flows through said instrument, of a bulb resistance included in an arm of said bridge, and a switch having a plurality of contacts for securing an approximate balance of the bridge, each switch contact giving a reading, the range of said measuring instrument being equal to the difference in readings of neighboring switch contacts.

14. In temperature measuring apparatus, the combination with a Wheatstone bridge and its source of current and a measuring instrument associated with said bridge and calibrated in units of temperature and pointing to mid scale when no current flows through said instrument, of a bulb resistance included in an arm of said bridge, and a switch having a plurality of contacts for securing an approximate balance of the bridge, each switch contact giving a reading, said measuring instrument giving a reading supplemental to the switch contact reading, and each switch contact reading being lower than the true temperature, when the bridge is balanced by that contact, by an amount equal to the mid scale reading of said measuring instrument.

15. In temperature measuring apparatus, the combination with a Wheatstone bridge and its source of current and its galvanometer associated with said bridge, of a bulb resistance included in an arm of said bridge, means for approximating or attaining a balance of the bridge, and a resistance in a conjugate conductor of said bridge for maintaining the current through said galvanometer the same for the same change in bulb resistance.

16. In temperature measuring apparatus, the combination with a Wheatstone bridge and its source of current and its galvanometer associated with said bridge, of a bulb resistance included in an arm of said bridge, means for approximating or attaining a balance of the bridge, a resistance external to the bridge arms, and means for bringing into circuit said resistance for rendering the difference of potential at the galvanometer terminals dependent only upon the change in bulb resistance.

17. In temperature measuring apparatus, the combination with a Wheatstone bridge and its source of current and a measuring instrument associated with said bridge and having a substantially uniform scale, of a bulb resistance included in an arm of said bridge, and a switch in a conjugate conductor for changing the amount of resistance in neighboring bridge arms, said resistances in neighboring bridge arms being of a magnitude for securing approximate balance of the bridge and for compensating for the non-uniform change in bulb resistance with relation to the temperature to which it is subjected.

18. In temperature measuring apparatus, the combination with a Wheatstone bridge and its source of current and a measuring instrument associated with said bridge and having a substantially uniform scale and pointing to mid scale reading when said bridge is balanced, of a bulb resistance included in an arm of said bridge, means associated with said bridge for compensating for the non-uniform change in bulb resistance with relation to the temperature to which it is subjected, and means for rendering the current through said measuring instrument dependent only upon the change in bulb resistance.

19. In temperature measuring apparatus, the combination with a Wheatstone bridge and its source of current and a measuring instrument associated with said bridge, of a bulb resistance included in an arm of said bridge, and means for approximately balancing the bridge to give a temperature indication, said measuring instrument giving a reading supplemental to said indication and pointing to mid scale when no current flows through said instrument, the indication given by said balancing means being low by an amount equal to the mid scale reading of said measuring instrument.

20. The combination with a Wheatstone bridge and its source of current and galvanometer in conjugate conductors of said bridge, of a plurality of resistances tapped into neighboring bridge arm resistances, and a switch for bringing said resistances into circuit in a conjugate conductor.

21. The combination with a Wheatstone bridge and its source of current and galvanometer in conjugate conductors of said bridge, of a plurality of resistances tapped into neighboring bridge arm resistances at different points, and a switch for bringing said resistances into circuit in series with a conjugate conductor.

22. The combination with a Wheatstone bridge and its source of current and galvanometer in conjugate conductors of said bridge, of a plurality of resistances of different magnitudes tapped into adjacent bridge arm resistances at different points, the bridge arm resistances between taps being of different magnitudes, and a switch for bringing said different resistances into circuit in series with a conjugate conductor.

23. The combination with a Wheatstone bridge and its source of energy and a measuring instrument in conjugate conductors of said bridge, of a variable resistance in a bridge arm, and means for causing the current through said measuring instrument to depend only upon the resistance change of said variable resistance without regard to its absolute resistance, said means comprising a plurality of resistances tapped in at different points in adjacent bridge arm resistances, and a switch for bringing said resistances into circuit in a conjugate conductor.

24. The combination with a Wheatstone bridge and its source of energy and a measuring instrument in conjugate conductors of said bridge, of a variable resistance in a bridge arm, and means for causing the current through said measuring instrument to depend only upon the resistance change of said variable resistance without regard to its absolute resistance, said means comprising a plurality of resistances of different magnitudes tapped in at different points in adjacent bridge arm resistances, the bridge arm resistances between taps being of different magnitudes, and a switch for bringing said different resistances into circuit in series with a conjugate conductor.

25. In measuring apparatus, the combination with a plurality of circuit branches, of a galvanometer and a source of current associated with said circuit branches, said galvanometer being calibrated in definite units and giving mid scale indication when there is an electrical balance, a resistance in a circuit branch changing with the quantity whose magnitudes are to be measured, a switch comprising a plurality of contacts, a plurality of resistances controlled by said switch, each switch contact giving a reading, said galvanometer giving a reading supplemental to the switch contact reading, and each switch contact reading being lower than the reading given by the apparatus by an amount equal to the mid scale reading of said galvanometer.

26. In measuring apparatus, the combination with a plurality of circuit branches, of a galvanometer and a source of current associated with said circuit branches, said galvanometer being calibrated in definite units and giving mid scale indication when there is an electrical balance, a resistance in a circuit branch changing with the quantity whose magnitudes are to be measured, a switch comprising a plurality of contacts, and a plurality of resistances in one of said circuit branches controlled by said switch, each switch contact giving a reading, and said galvanometer readings being supplemental to the switch contact readings.

In testimony whereof we have hereunto affixed our signatures in the presence of the two subscribing witnesses this 19th day of November, 1908.

EDWIN F. NORTHRUP.
MORRIS E. LEEDS.
CHARLES R. CARY.

Witnesses:
HENRY S. PRICKETT,
GEO. S. GANDY.